H. S. JUDD.
WASHING MACHINE.
APPLICATION FILED NOV. 3, 1905.

936,634.

Patented Oct. 12, 1909.
4 SHEETS—SHEET 1.

Witnesses:

Inventor:
Henry S. Judd
By Cheever & Cox
Attys

H. S. JUDD.
WASHING MACHINE.
APPLICATION FILED NOV. 3, 1905.

936,634.

Patented Oct. 12, 1909.
4 SHEETS—SHEET 2.

Witnesses:

Inventor:
Henry S. Judd
By Cheever & Cox
Attys.

H. S. JUDD.
WASHING MACHINE.
APPLICATION FILED NOV. 3, 1905.
936,634.
Patented Oct. 12, 1909.
4 SHEETS—SHEET 3.
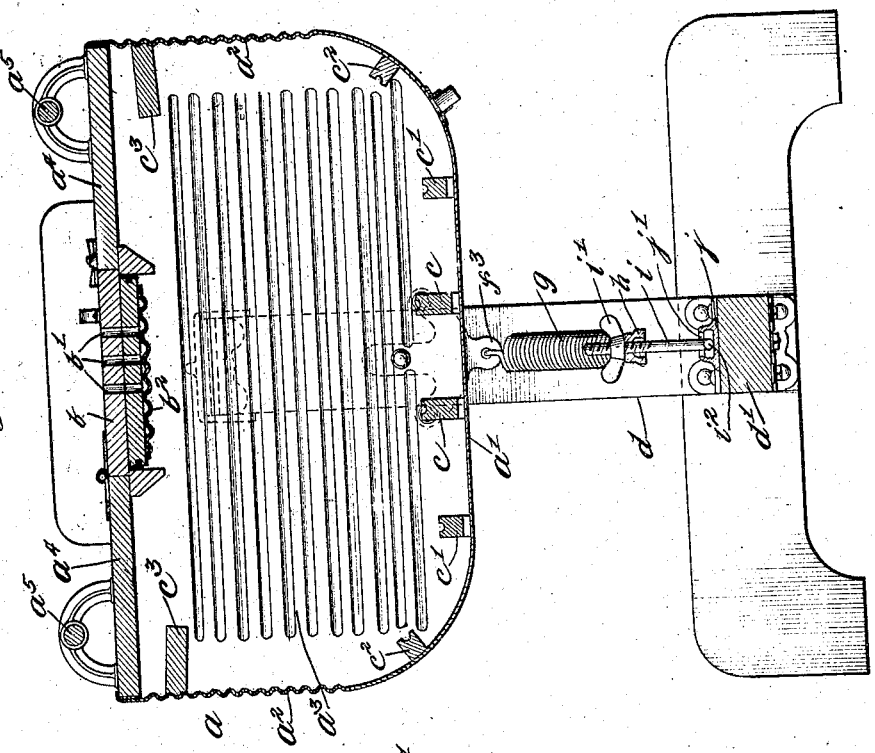
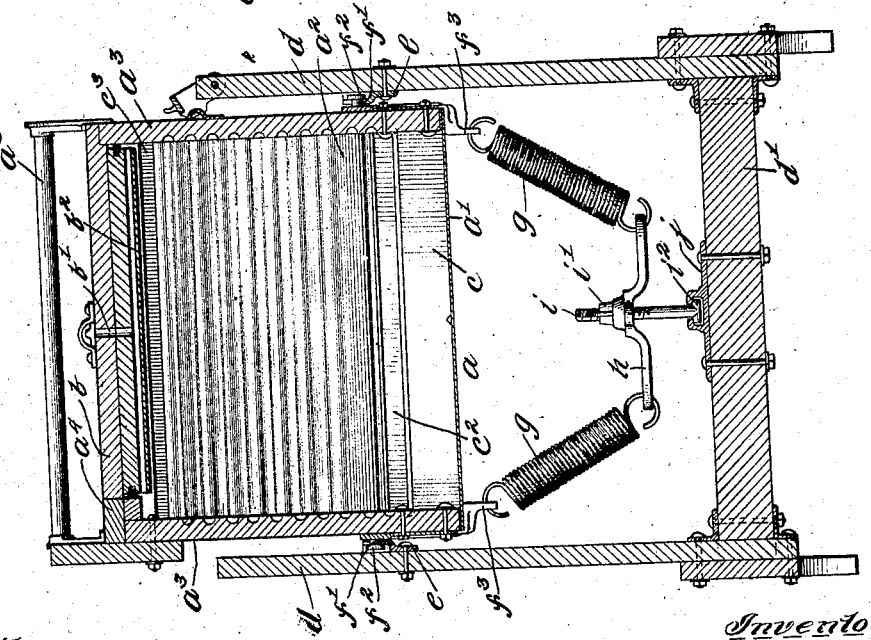
Witnesses:
Inventor:
Henry S. Judd
By Cheever & Cox
Att'ys H. S. JUDD.
WASHING MACHINE.
APPLICATION FILED NOV. 3, 1905.
936,634.
Patented Oct. 12, 1909.
4 SHEETS—SHEET 4.
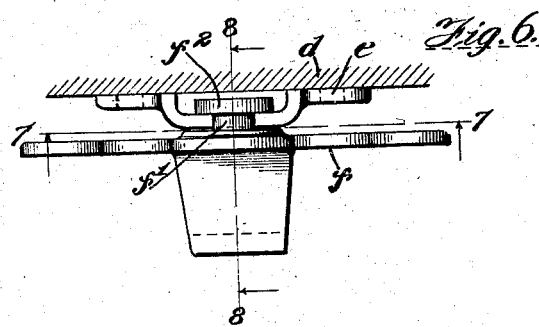
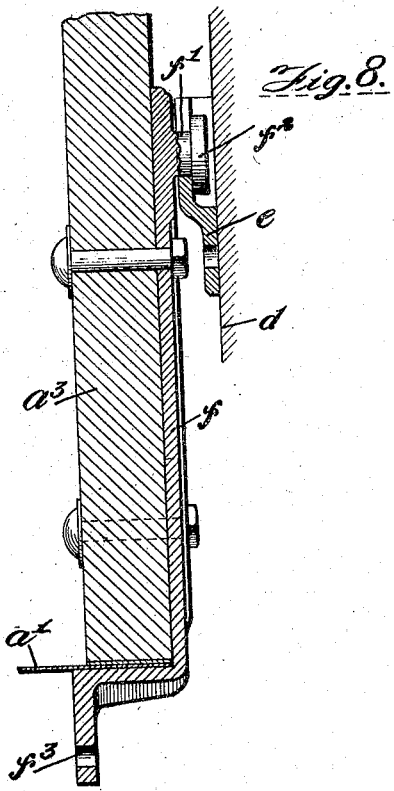
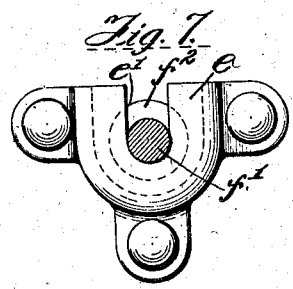
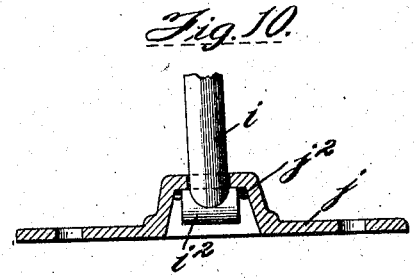
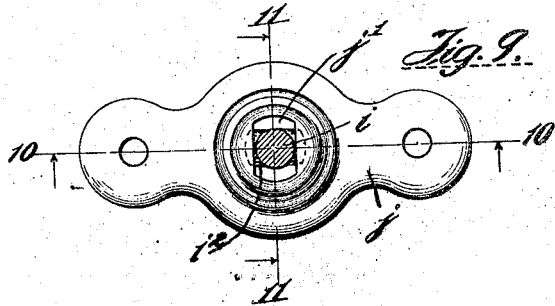
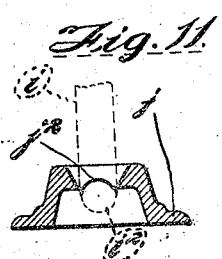
Witnesses:
Asa D. Perry
Robert H. Weir
Inventor:
Henry S. Judd
By Cheever & Cox
Attys

UNITED STATES PATENT OFFICE.

HENRY S. JUDD, OF CHICAGO, ILLINOIS, ASSIGNOR TO H. S. JUDD MANUFACTURING COMPANY, OF CHICAGO, ILLINOIS, A CORPORATION OF ILLINOIS.

WASHING-MACHINE.

936,634.

Specification of Letters Patent. Patented Oct. 12, 1909.

Application filed November 3, 1905. Serial No. 285,714.

*To all whom it may concern:*

Be it known that I, HENRY S. JUDD, a citizen of the United States, residing at Chicago, in the county of Cook and State of Illinois, have invented a certain new and useful Improvement in Washing-Machines, of which the following is a specification.

My invention relates to washing machines wherein the vessel is pivoted upon a supporting frame and adapted to oscillate thereon with the assistance of one or more tension springs.

One form of my invention is illustrated in the accompanying drawings, wherein—

Figure 1:
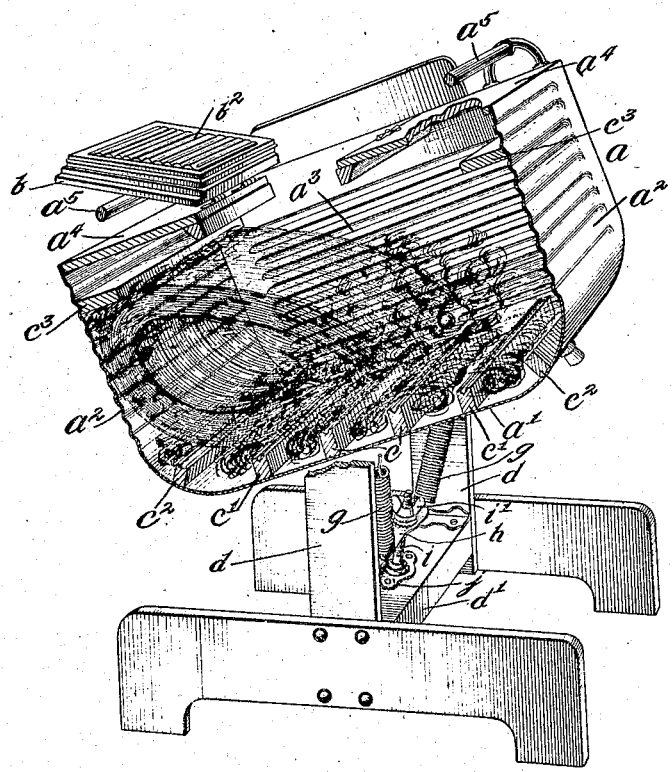
Figure 2:
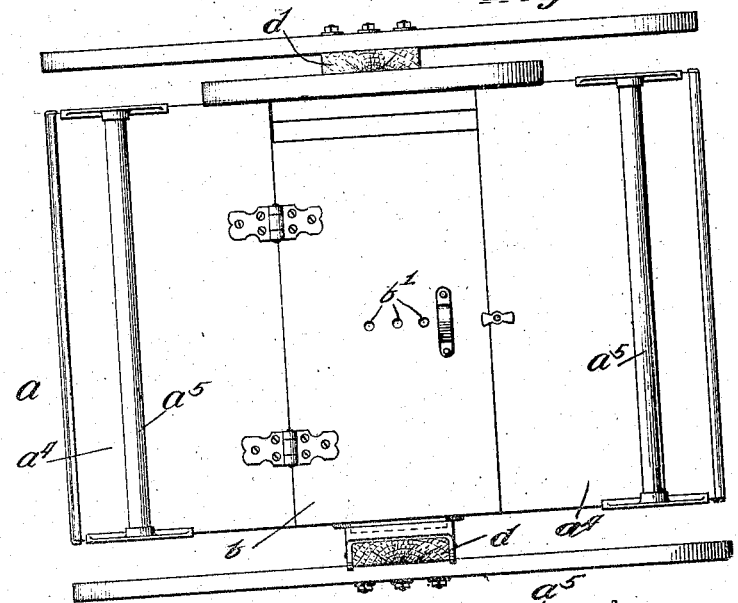
Figure 3:
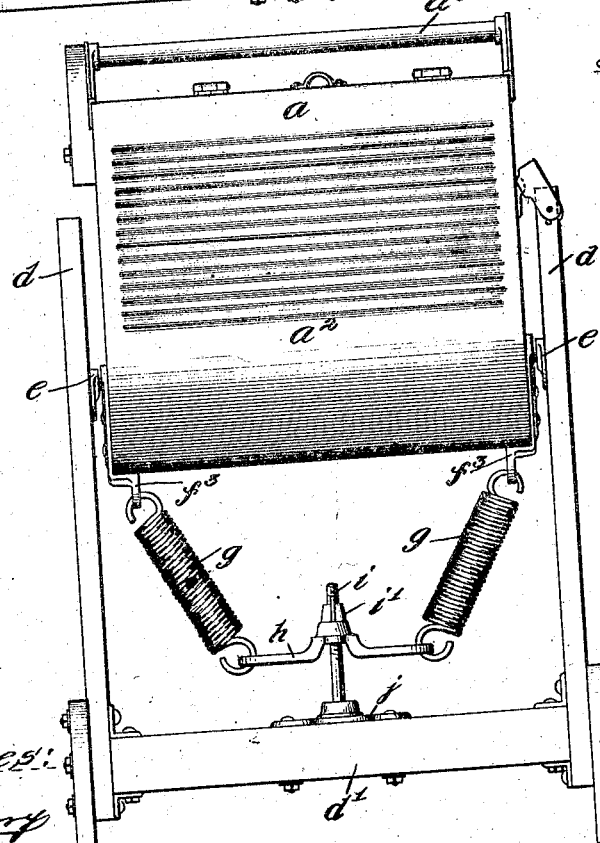

Figure 1 is a general perspective view with the nigh side of the vessel broken away for the better illustration of the overturning and the dashing action which the vessel produces when filled and in operation. Figs. 2 and 3 are plan and end views respectively. Figs. 4 and 5 are vertical sectional views taken respectively transversely and longitudinally of the vessel. Fig. 6 is a plan view of the cheek plate and trunnion which form the pivot connection between the vessel and its supporting frame. Figs. 7 and 8 are views in elevation taken respectively on the lines 7—7 and 8—8 Fig. 6. Fig. 9 is a plan view of the yoke rod and the plate whereby it is detachably attached to the supporting frame. Figs. 10 and 11 are sectional views taken respectively on the lines 10—10 and 11—11 Fig. 9.

Similar letters refer to similar parts throughout the several views.

The body of the machine consists of the vessel $a$ having its bottom $a^1$ and ends $a^2$ made from sheet metal such as zinc or galvanized iron. The bottom $a^1$ is substantially flat and the ends $a^2$ are arranged at substantially right angles thereto in such manner that when the vessel is at rest in normal position the bottom will lie horizontal and the ends vertical as best shown in Fig. 5. It is desirable that the upper portion of the vessel ends be corrugated in the manner shown for obtaining a rubbing action upon the clothes. The sides $a^3$ of the vessel consist preferably of wood and their inner surfaces are also grooved or corrugated for producing an additional rubbing effect upon the clothing. By preference the top $a^4$ is also of wood; and the handles $a^5$, which may be of any suitable type, are provided for operating the machine. There is an opening in the top of the vessel for affording access to the interior, which opening is closed by a cover $b$ which fits said aperture and is hinged to the top $a^4$. When the contents of the vessel rush from end to end, the air within has a tendency to become first compressed in parts and then expanded, and to make provision for maintaining the inner air at atmospheric pressure, I provide one or more vents $b^1$ in cover $b$. For the purpose of preventing water from dashing directly through said vents, I attach a corrugated sheet $b^2$ on the inside of the cover as best shown in Figs. 1, 4 and 5, and the furrows or channels in said sheet form ducts through which air may be conveyed from the sides of the cover to the vents $b^1$, the sheet itself extending across the vents and preventing the direct access of water thereto. By this means air is free to pass in or out through the cover but water is prevented from splashing through. Said sheet $b^2$ performs the double function of a shield and of a rubbing board upon which the clothing may be rubbed in spots by hand if desired.

Within the vessel, breakers are secured which consist of cleats, preferably of wood, running crosswise of the vessel, that is, in a direction parallel to the axis of oscillation. By preference there are eight of these breakers and they are arranged symmetrically with respect to the axis of oscillation. The breakers $c$ are located near the center of the bottom and are somewhat higher than the breakers $c^1$ and $c^2$ which are located near the curved portions at the ends of the bottom.

The above described vessel which constitutes the body of the machine is pivotally mounted in a supporting framework, as will be hereinafter described, and the point of pivoting is such that the axis of oscillation is substantially midway between the bottom and center of the vessel. The supporting framework comprises, among other suitable parts, the uprights $d$, $d$, and the connecting cross piece $d^1$ at or near the base of the framework.

The pivotal bearings whereby the vessel is pivotally connected to the supporting framework consist of the cheek plate $e$ and trunnion plate $f$ shown in detail in Figs. 6, 7 and 8. Said cheek plate consists of a chambered plate secured to the upright $d$ and having a vertically arranged notch $e^1$ therein for receiving the trunnion $f^1$ of plate $f$. Said notch, being open at the top, permits the entire vessel being removed from the supporting frame by merely lifting it out of engagement with plate $e$. Said plate $f$ is fastened to the vessel-side $a^3$ and has formed thereon the trunnion $f^1$ with the head $f^2$ which is formed at the extremity of said trunnion and is adapted to enter the chamber of the cheek plate in such manner as to engage the same and prevent play of the parts in a direction parallel to the axis of oscillation. Inasmuch as the vessel itself is rigid and the trunnion plate $f$ is rigidly secured thereto and the plates $e$, $f$, are mutually interfitting, it follows that when the vessel is in position in its bearing, it constitutes a tie piece and brace which prevents the spreading of the upright $d$, and prevents disengagement of the parts. One important advantage in this construction is that it permits the supporting frame to be made light and substantially without interfering cross braces and yet affords a construction which is rigid and durable. By preference the plate $f$ extends to the bottom of the machine where it has an eye $f^3$ for attachment to tension spring $g$. There is one of these tension springs upon each side of the machine, and they extend downward therefrom and are connected at their lower extremity to the yoke $h$. Said yoke is apertured to receive the yoke rod $i$ and in the preferred construction the upper portion of said rod is threaded and has a wing nut $i^1$ thereon adapted to engage the yoke $h$ and adjustably retain the same in position upon said rod. At the lower end of said rod there is formed a head $i^2$ as best shown in Figs. 9, 10 and 11. This head is, in the preferred form, cylindrical or approximately so with its axis transverse to the length of the rod. Said head is adapted to be engaged by the plate $j$ which is rigidly secured to the cross piece $d^1$ of the framework and is chambered to receive said head. There is a slot $j^1$ in the top of the chambered portion of plate $j$, said slot being of a length greater than the length of said head, and of a width less than the length of said head. By this construction the head may be slipped into the slot in plate $j$, but by turning it around 90° may be retained within said plate. By preference, in order that the rod may tend to remain in its operative position, plate $j$ is cylindrically recessed at the inner surface of the top at point $j^2$ as shown in Figs. 10 and 11. This forms a bearing about which as a center the rod $i$ may rock when the vessel is oscillated.

In operation, the vessel is filled perhaps a third or quarter full of water and clothing or fabrics, and after the cover $b$ is closed the vessel is caused by hand to oscillate upon the trunnion bearings $e$, $f$. As the machine is tilted downward at one end the contents rush toward that end, the over balanced weight of the vessel and contents tending to stretch the springs $g$ which consequently assist in the return movement of the vessel, as in the known types of machine. In this machine however, the relative dimensions are such that the water and clothing which are at the bottom of the vessel when moving in one direction will be deflected by the breakers $c^2$, the end $a^2$, and breakers $c^3$ in such manner as to cause a complete overturning with the result that the portion which was on the bottom at first, will next occupy a position on the top. The air seems to be, by the action of the water, compressed at the ends of the vessel under the breakers $c^3$ and perhaps behind the breakers $c^2$ and $c^1$, with the result that a complete overturning of the contents is effected at every movement of the vessel. After the contents are deflected by breakers $c^3$ they continue on until they dash down upon the remaining portion of the contents, and as the two portions are thus moving in opposite directions a very forceful agitation and intermixing takes place, the action being in the nature of a blow of the downward moving jet upon the remainder of the contents. As a result of this action water and air are forced through the meshes of the fabric thereby dislodging and removing all dirt and grease. Moreover as a result of the proportions and construction of the parts, the contents on their return drop beyond the center of the vessel and thus assist in the reversal of movement of the vessel. This reduces to a minimum the amount of labor required to operate the machine.

The size and shape and proportions of the several parts are what have appeared to me to be the best, but they may of course, be varied.

It is important that the tub at its ends be pivoted far below its center of gravity and considerably below the surface of the normal quantity of water which is to be used in the tub. It is this method of mounting which tends to throw the water bodily from one side of the tub to the other as the oscillations proceed as distinguished from simply throwing the water to and fro within the tub which is the action when the tub is rocked on rockers or is pivoted above its center of gravity or above the normal level of water within the tub.

What I claim as new and desire to secure by Letters Patent, is;

1. In a washing machine the combination of a supporting frame, a vessel pivotally supported thereon, a spring connected at one end to said vessel for assisting in oscillating the same about its axis, and connections between said spring and said frame, said connections comprising a chambered plate secured to said frame and having an aperture therein, said connections also including a rod connected to said spring and having a head adapted to be engaged by said plate, the length of said head being less than the length of the plate aperture so that the head may enter, but the length of said head being greater than the width of said plate aperture so that the pin may not be withdrawn when the head is turned crosswise of the plate aperture.

2. In a washing machine the combination of a supporting frame, a vessel pivotally supported thereon, springs connected at one end to said vessel, a yoke connected to the other end of said springs, a rod adjustably connected to said yoke, and a chambered plate fastened to said frame, said plate having a slot therein, and said rod having a cylindrical head thereon adapted to rock against the inner surface of said plate, said head being shorter than the length and longer than the width of the slot in said plate.

3. In a washing machine, the combination of a tub with laterally projecting trunnions on its ends below the center of gravity of the tub and below the normal level of water within the tub and considerably above the bottom of the tub, supports on which the trunnions are pivoted, plates connected with such trunnions secured to the ends of the tub and extending downward to the bottom, a swivel plate on the frame beneath the tub and springs which are attached to a swivel attachment on the frame at one end and at the other end to such plates.

In witness whereof, I have hereunto subscribed my name in the presence of two witnesses.

HENRY S. JUDD.

Witnesses:
HOWARD M. COX,
CAROLYN RAFTERY.